(12) United States Patent
Kondo

(10) Patent No.: US 11,478,738 B2
(45) Date of Patent: Oct. 25, 2022

(54) AIR FILTER DEVICE

(71) Applicant: AISAN KOGYO KABUSHIKI KAISHA, Obu (JP)

(72) Inventor: Norihiro Kondo, Toyota (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 218 days.

(21) Appl. No.: 16/911,698

(22) Filed: Jun. 25, 2020

(65) Prior Publication Data

US 2020/0406180 A1 Dec. 31, 2020

(30) Foreign Application Priority Data

Jun. 27, 2019 (JP) .............................. JP2019-119449

(51) Int. Cl.
*B01D 46/00* (2022.01)
*B60K 15/04* (2006.01)
(Continued)

(52) U.S. Cl.
CPC ........... *B01D 46/001* (2013.01); *B01D 39/08* (2013.01); *B01D 46/0005* (2013.01);
(Continued)

(58) Field of Classification Search
CPC .. B01D 46/001; B01D 46/0005; B01D 39/08; B01D 2239/0618; B01D 2279/40; B60K 15/04; B60K 2015/03236; F02M 35/02425; F02M 35/02433; F02M 35/02483; F02M 35/02441; F02M 25/0836; F02M 25/0872
(Continued)

(56) References Cited

U.S. PATENT DOCUMENTS

| | | | |
|---|---|---|---|
| 9,434,248 B2 | 9/2016 | Hagano et al. | |
| 2006/0032482 A1* | 2/2006 | Sung | B60K 15/04 |
| | | | 123/518 |

(Continued)

FOREIGN PATENT DOCUMENTS

| | | | |
|---|---|---|---|
| JP | 2003252071 A | * | 9/2003 |
| JP | 2009073449 A | | 4/2009 |

(Continued)

OTHER PUBLICATIONS

Japanese Office Action dated Jul. 20, 2022, for Japanese Application No. 2019-119449 (5 p.).

(Continued)

*Primary Examiner* — Mahmoud Gimie
(74) *Attorney, Agent, or Firm* — Conley Rose, P.C.

(57) ABSTRACT

An air filter device includes an air filter and a filter case having a filter housing for housing the air filter. The filter case has a pipe part enclosing an outer circumference of a second end of a filler pipe. The second end of the filler pipe defines a fuel filler opening and is opposite to a first end of the filler pipe connected to a fuel tank of a vehicle. A distance between the pipe part and the fuel filler opening is less than a distance between the filter housing and the fuel filler opening. The pipe part is configured to be inserted into a fixed member fixed to a vehicle body. The pipe part has a flange that extends radially outward from the pipe part and is spaced apart from the filter housing in an axial direction.

12 Claims, 8 Drawing Sheets

(51) Int. Cl.
- *B01D 39/08* (2006.01)
- *F02M 35/024* (2006.01)
- *F02M 25/08* (2006.01)
- *B60K 15/03* (2006.01)

(52) U.S. Cl.
CPC ....... *B60K 15/04* (2013.01); *F02M 35/02425* (2013.01); *F02M 35/02433* (2013.01); *F02M 35/02441* (2013.01); *F02M 35/02483* (2013.01); *B01D 2239/0618* (2013.01); *B01D 2279/40* (2013.01); *B60K 2015/03236* (2013.01); *F02M 25/0836* (2013.01); *F02M 25/0872* (2013.01)

(58) Field of Classification Search
USPC .......................................................... 96/396
See application file for complete search history.

(56) References Cited

U.S. PATENT DOCUMENTS

2015/0151632 A1  6/2015  Fujiwara et al.
2018/0347518 A1* 12/2018  Martin ............. F02M 35/02425

FOREIGN PATENT DOCUMENTS

| | | |
|---|---|---|
| JP | 2014069618 A | 4/2014 |
| JP | 2016113101 A | 6/2016 |
| JP | 2018083599 A | 5/2018 |

OTHER PUBLICATIONS

English Translation of Japanese Office Action dated Jul. 20, 2022, for Japanese Application No. 2019-119449 (5 p.).

* cited by examiner

AIR FILTER DEVICE

CROSS-REFERENCE TO RELATED APPLICATIONS

This application claims priority to Japanese patent application serial number 2019-119449, filed Jun. 27, 2019, which is incorporated herein by reference in its entirety for all purposes.

STATEMENT REGARDING FEDERALLY SPONSORED RESEARCH OR DEVELOPMENT

Not applicable.

BACKGROUND

This disclosure relates generally to air filter devices.

One type of conventional vehicle having an internal combustion engine (i.e., engine), such as an automobile, includes a canister disposed between a fuel tank and an air communication port. The canister is filled with an adsorbent for adsorbing and desorbing fuel vapor generated in the fuel tank. Thus, the canister can trap the fuel vapor flowing therein from the fuel tank, so as to prevent the fuel vapor from flowing into the surrounding atmosphere. When a purge condition is met during operation of the engine, the fuel vapor adsorbed in the canister is desorbed, and then supplied to an intake passage in communication with the engine. The canister discharges air from the air communication port while the mixed gas, including the fuel vapor and air, flows into the canister from the fuel tank. In addition, the canister suctions air via the air communication port while the fuel vapor desorbed from the adsorbent of the canister flows to the intake passage.

The air communication port is preferably positioned away from the ground, so as to prevent an influx of foreign material, such as dust. Japanese Laid-Open Patent Publication No. 2009-73449 discloses one such fuel supply device, which has the air communication port formed by a cover surrounding a fuel filler opening of a filler pipe. The cover includes an air filter housing that houses an air filter that blocks foreign material, such as dust, present in the air introduced via the air communication port. The filter housing is positioned at an outer circumference of a filler pipe connection part, which is connected to a filler pipe.

SUMMARY

In one aspect of this disclosure, an air filter device is configured to be attached to a tubular filler pipe, which has a first end connected to a fuel tank of a vehicle and a second end defining a fuel filler opening. The air filter device includes an air filter for filtering atmospheric air and a filter case comprising a filter housing for housing the air filter. The filter case also comprises a tubular pipe part enclosing an outer periphery of the second end of the filler pipe. The tubular pipe part is disposed closer to the fuel filler opening than the filter housing part. The pipe part is configured to be inserted into a ring-shaped fixed member that is fixed to a vehicle body. The tubular pipe part has a flange extending radially outward from an outer periphery of the tubular pipe part. The flange is spaced apart from the filter housing in an axial direction of the tubular pipe part.

In accordance with this aspect, it is possible to avoid the filter housing from coming into contact with the fixed member. As a result, breakage of the filter housing part and the air filter can be prevented.

BRIEF DESCRIPTION OF THE DRAWINGS

For a detailed description of the preferred embodiments of the present teaching, reference will now be made to the accompanying drawings.

DETAILED DESCRIPTION

As previously described, some conventional fuel supply devices have an air communication port formed by a cover surrounding a fuel filler opening of a filler pipe. The cover includes an air filter housing that houses an air filter. The filter housing is positioned at the outer circumference of a filler pipe connection part connected to a filler pipe. The filler pipe may be made from a resin material. In such case, the filler pipe may expand in an axial direction thereof in response to an ambient temperature (e.g., due to thermal expansion), thereby undesirably contacting a fixing member fixing the fuel supply device on a vehicle body.

A first embodiment will be described below with reference to FIGS. 1 to 7. In this embodiment, an air filter device 60 is mounted on a vehicle, such as an automobile.

Figure 1:
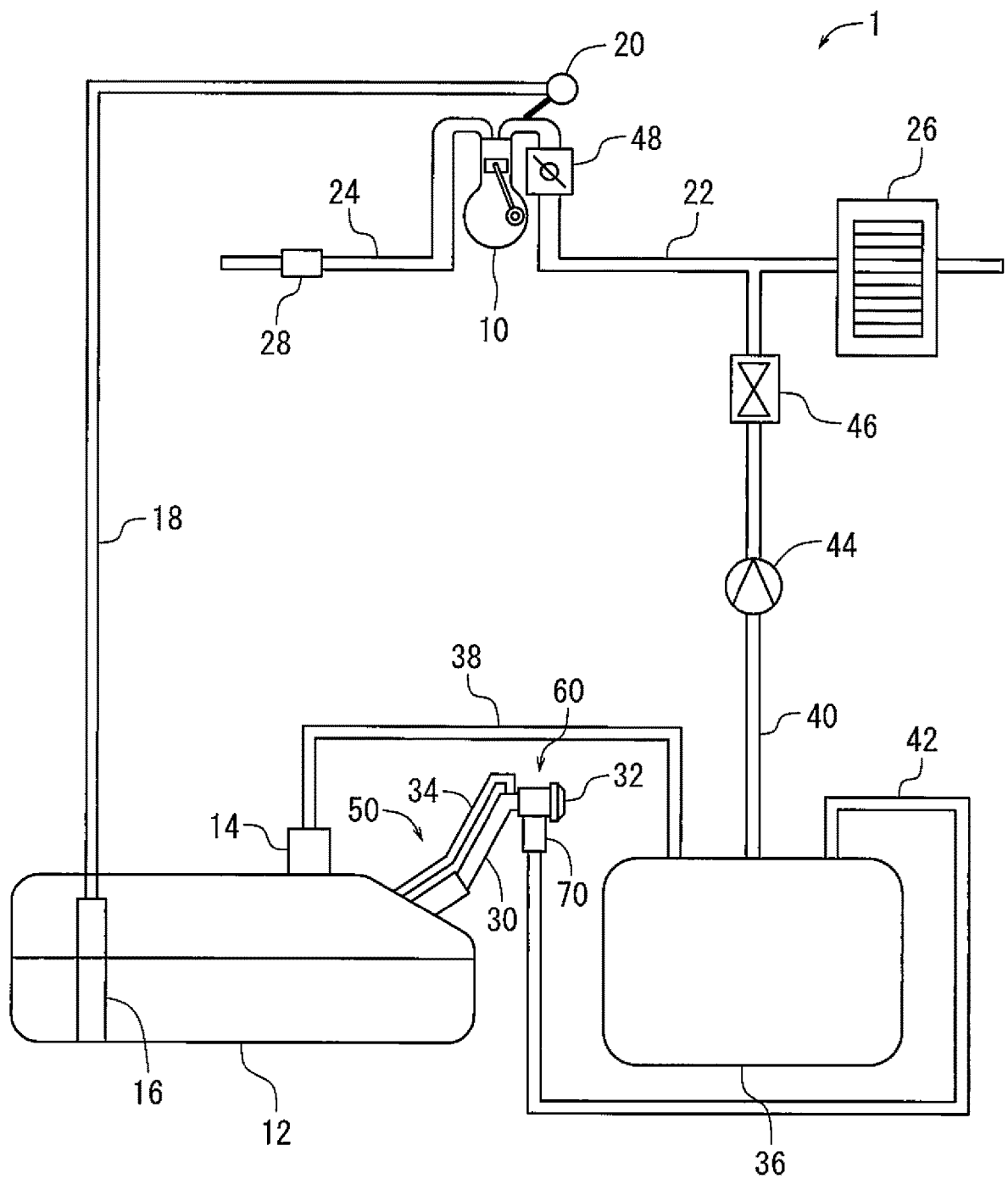
FIG. 1 is a schematic view of a first embodiment of a fuel system including an air filter device in accordance with the principles described herein.

As illustrated in FIG. 1, a fuel system 1 of the vehicle includes an engine 10, a fuel tank 12 for storing liquid fuel, such as gasoline, to be supplied to the engine 10, and a canister 36 configured to adsorb fuel vapor generated in the fuel tank 12. The fuel tank 12 includes a cut-off-valve 14 at a top wall thereof and a fuel pump 16 disposed therein. The fuel pump 16 is configured to supply fuel to the engine via a communication pipe 18 and injectors 20. The engine 10 includes engine cylinders (not illustrated) in communication with both an intake passage 22 and an exhaust passage 24. The intake passage 22 has one end connected to the engine 10 and the other end, which is provided with an air cleaner 26, in fluid communication with the atmosphere. The exhaust passage 24 has one end connected to the engine 10 and another end in fluid communication with the atmosphere via a muffler, a catalytic converter 28, etc.

The fuel tank 12 is connected to a filler pipe 30. The filler pipe 30 may be made from suitable materials, such as resin or metal. The filler pipe 30 has a fuel filler opening 32 at a tip end thereof. During refueling, a fuel feed nozzle is connected to the fuel filler opening 32 so as to feed fuel into the fuel tank 12 via the filler pipe 30. The fuel tank 12 is provided with a breather pipe 34 substantially parallel to the filler pipe 30. The breather pipe 34 has one end in fluid communication with the filler pipe 30 near the fuel filler opening 32, and the other end connected to the fuel tank 12 so as to be in direct communication with a gas layer in the fuel tank 12.

The fuel tank 12 is connected to the canister 36 via a vapor passage 38, such that one end of the vapor passage 38 is connected to the cut-off valve 14 of the fuel tank 12 and the other end of the vapor passage is connected to the canister 36. Accordingly, fuel vapor evaporated in the fuel tank 12 is introduced into the canister 36 via the vapor passage 38. The canister 36 is filled with an adsorbent, such as activated carbon, to adsorb and desorb the fuel vapor.

The canister 36 is connected to the intake passage 22 via a purge passage 40. A purge pump 40 and a purge control valve 46 are disposed along the purge passage 40 for controlling the amount of fluid flowing through the purge passage 40. The intake passage 22 is provided with a throttle valve 48 positioned between the engine 10 and the air cleaner 26. The purge passage 40 is connected to the intake passage 22 on the upstream side of the throttle valve 48 and on the downstream side of the air cleaner 26.

Figure 4:
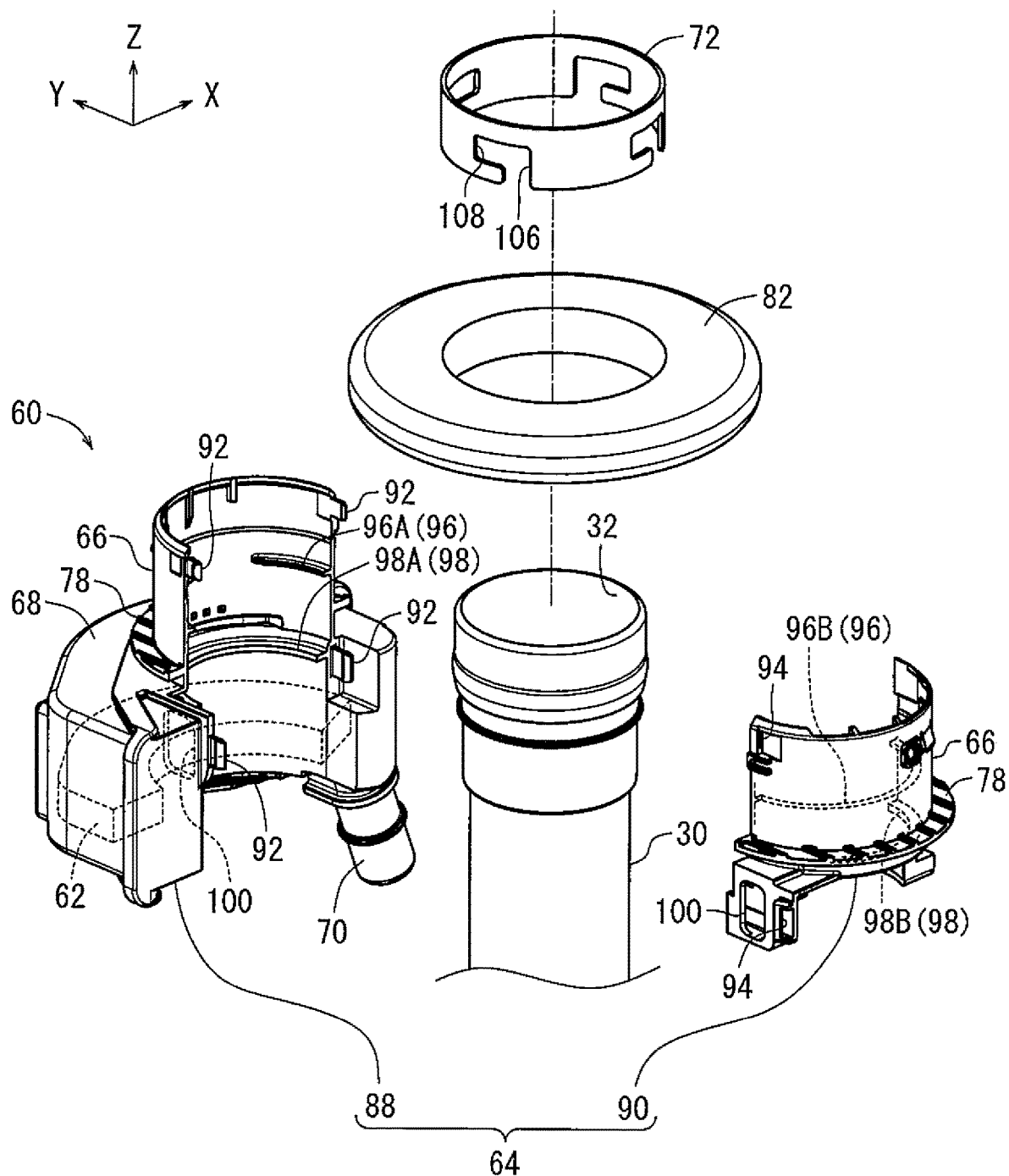
FIG. 4 is an exploded view of the air filter device of FIG. 1.

The canister 36 is connected to a canister connection pipe 70 of the air filter device 60 via an atmospheric passage 42. As illustrated in FIG. 4, the air filter device 60 is formed to surround a portion of the filler pipe 30 near the fuel filler opening 32. The canister connection pipe 70 is in fluid communication with the atmosphere via a tubular pipe part 66 and a filter housing 68.

Next, a feed pipe device 50 for the fuel tank 12 will be described in accordance with the present embodiment. The feed pipe device 50 includes the air filer device 60, the filler pipe 30, the breather pipe 34, a ring member 72, and possibly some other components. For purposes of clarity and further explanation, a coordinate axes system is defined on the basis of the X, Y, and Z directions illustrated in FIGS. 2 to 4. In particular, the X direction shows the leftward direction, the Y direction shows the frontward direction, and the Z direction shows the upward direction. It should be appreciated that the X, Y, and Z directions do not limit the installation orientation of the feed pipe device 50 on the vehicle.

Figure 2:
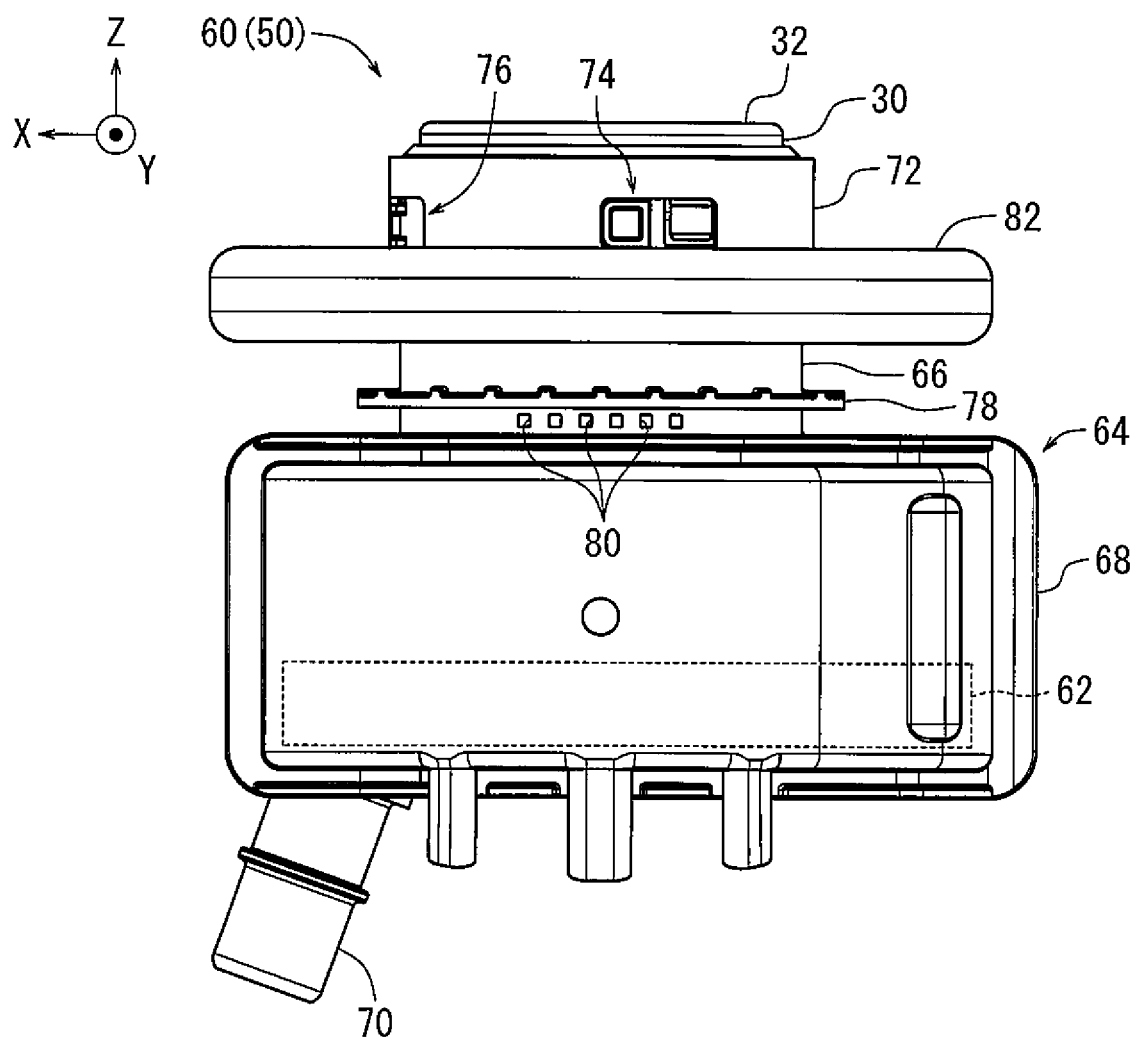
FIG. 2 is a front view of the air filter device of FIG. 1.
Figure 3:
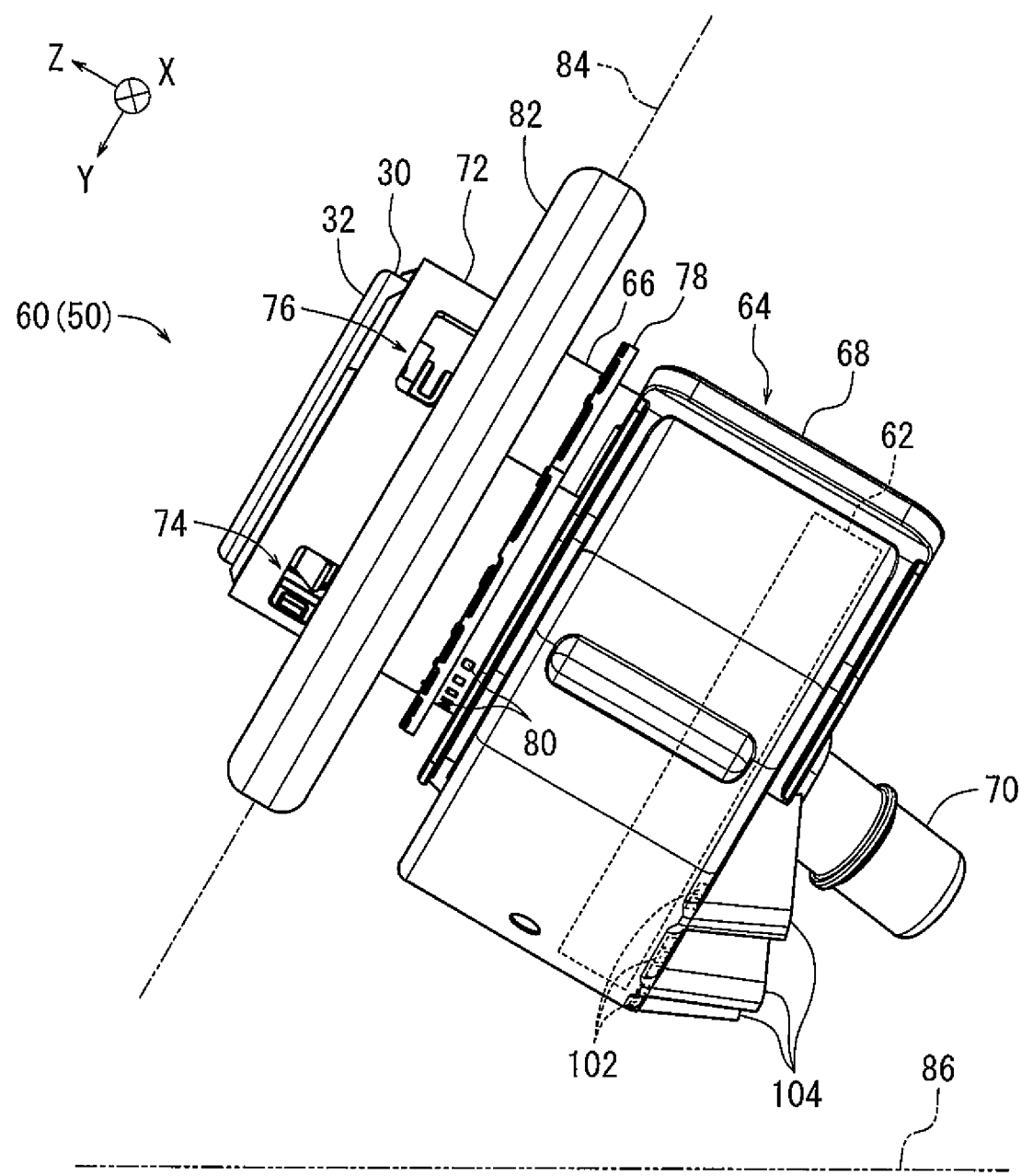
FIG. 3 is a right side view of the air filter device of FIG. 1.

As illustrated in FIGS. 2 and 3, the air filter device 60 includes an air filter 62 and a filter casing 64. The air filter 62 may be made of a non-woven fabric or the like. The filter casing 64 may be made form a resin material. The filter casing 64 includes the pipe part 66, the filter housing 68, and the canister connection pipe 70. The pipe part 66 is formed to surround an outer circumference, such as the outer periphery, of the filler pipe 30. The filter housing 68 is positioned below the pipe part 66 and is configured to house the air filter 62 therein. The ring member 72 is attached to an upper end of the pipe part 66 near the fuel filler opening 32 such that an upper end of the filler pipe 30 and the upper end of the pipe part 66 are protected from impact. The ring member 72 may be made from metal. The filler pipe 66 and the ring member 72 are fixedly attached to each other by a first coupling 74 and a second coupling 76, which are described in more detail below.

A flange 78, which may generally have an annular, ring shape, extends radially outward from an outer circumference, such as an outer periphery, of the pipe part 66, such that the flange 78 is positioned above and spaced apart from the filter housing 68. The flange 78 has a plurality of ribs protruding upward from an upper surface thereof, so as to increase the strength of the flange 78. The pipe part 66 has a plurality of drain holes 80 between the flange and the filter housing 68. The drain holes 80 are aligned and spaced apart in the circumferential direction of the pipe part 66. As illustrated in FIG. 3, the feed pipe device 50 is fitted into a fixed member 82, which may have an annular ring shape and be made from rubber. The fixed member 82 may be fixably secured on a wall 84 of a vehicle body, so as to fixedly couple the feed pipe device 50 with the vehicle body. The feed pipe device 50 is mounted on the vehicle in a tilted state with respect to the ground 86, such that the drain holes 80 are arranged at a lower portion of the pipe part 66 that faces downward. Accordingly, the portion of the pipe part 66 having the drain holes 80 is positioned relatively closer to the ground 86 than other portions of the pipe part 66 not including the drain holes 80. Due to this configuration, liquid, such as water, which enters into a space between the pipe part 66 and the filler pipe 30 can be efficiently discharged to the outside of the pipe part 66, together with atmospheric air.

As illustrated in FIG. 4, the filter casing 64 includes a first casing part 88 and a second casing part 90. The first casing part 88 includes four fitting claws 92. The second casing part 90 includes four fitting holes 94 configured to be mate and fit with the fitting claws 92. During assembly of the air filter device 60, the fitting claws 92 of the first casing part 88 are fitted into the fitting holes 94 of the second casing part 90 with the filler pipe 30 held between the first casing part 88 and the second casing part 90. The first casing part 88 and the second casing part 90 are fixedly attached to each other via engagement of the fitting claws 92 and the mating fitting holes 94. As a result, the pipe part 66 is disposed about and surrounds the outer circumference of the filler pipe 30. Next, the pipe part 66 is inserted into the fixed member 82, which is secured to the wall 84 of the vehicle body, from the inside of the vehicle body toward the outside. At this time, the pipe part 66 is pressed into the fixed member 82 until the flange 78 contacts the fixed member 82, and then is pulled slightly back. Subsequently, the ring member 72 is attached to a portion of the pipe part 66, and in particular, the portion of the pipe 66 that is exposed to the outside of the vehicle body. Such attachment of the ring member 72 will be described in more detail below.

The first casing part 88 has a first rib half 96A and a second rib half 98A disposed on an inner surface of the first casing part 88 of the pipe part 66. The second casing part 90 has a first rib half 96B and a second rib half 98B disposed on an inner surface of the second casing part 90 of the pipe part 66. The first rib half 96A of the first casing part 88 and the first rib half 96B of the second casing part 90 collectively form a first rib 96 when the first and second casing parts 88, 90 are mated. The second rib half 98A of the first casing part 88 and the second rib half 98B of the second casing part 90 collectively form a second rib 98 when the first casing part 88 is engaged with the second casing part 90. The filler pipe 30 is held between the first casing part 88 and the second casing part 90 with the aid of the first and second ribs 96, 98. Each of the first rib 96 and the second rib 98 has a C-shape opening at one side. The first rib 96 and the second rib 98 are arranged such that the opening of the first rib 96 is circumferentially shifted relative to the opening of the second rib 98. The pipe part 66, the first rib 96, the second rib 98, and the filler pipe 30 form a labyrinth structure in a space between the pipe part 66 and the filler pipe 30. While atmospheric air can flow into the space between the pipe part 66 and the filler pipe 30 relatively easily through the labyrinth structure formed between the pipe part 66 and the filler pipe 30, a portion of foreign materials, such as dust, contained in the atmospheric air tend to stick to the pipe part 66, filler pipe 30, the first rib 96, and/or the second rib 98, so as to be separated from the air.

The filter housing 68 includes a communication hole 100, such that a downstream end of the labyrinth structure is in fluid communication with an interior of the filter housing 68 via the communication hole 100. The air flowing into the filter housing 68 passes through the air filter 62, flows through the canister connection pipe 70 and the atmospheric passage 42, and reaches the canister 36 (see FIG. 1 for the atmospheric passage 42 and the canister 36). At this time, the air flowing into the filter housing 68 is further filtered by the air filter 62. Accordingly, the air filter 62 removes dust that was not removed by the labyrinth structure.

As illustrated in FIG. 3, a plurality of drain holes 102 may be provided in a portion of the bottom plate of the filter housing 68 that is closer to the ground 86 than other portions when the filter housing 68 is fixed to the vehicle body. Further, on the lower surface of the bottom plate of the filter housing 68, three guide parts 104, each having a substantially rectangular tube shape, are formed so as to cover the drain holes 102. With this configuration, the water that cannot be completely drained by the drain holes 102 in the filter housing 68 can be drained to the outside of the filter housing 68 through the drain holes 80 in the pipe part 66.

Figure 5:
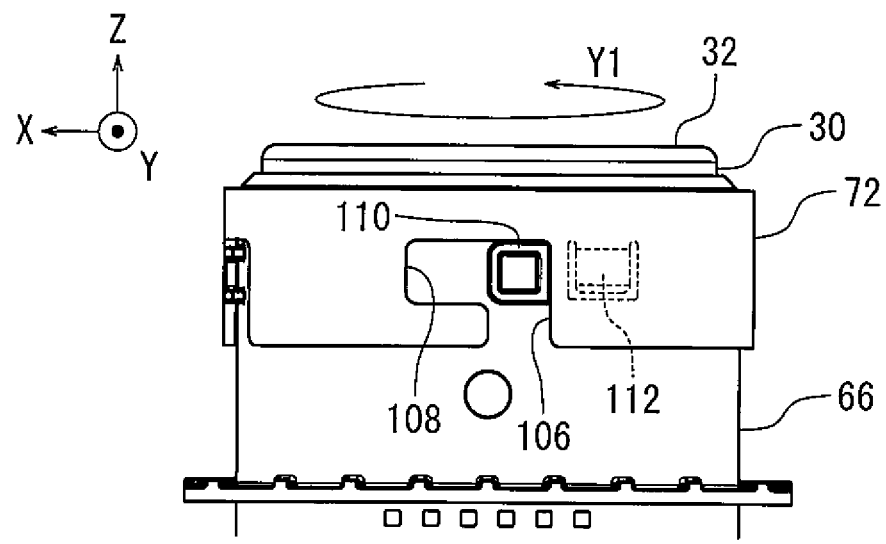
FIG. 5 is a front view showing a first assembly step of a first coupling of FIG. 2.
Figure 6:
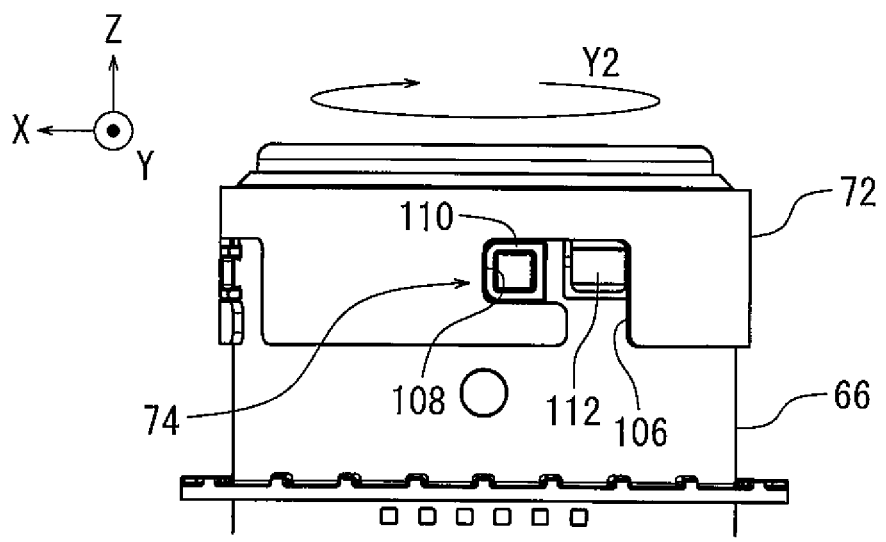
FIG. 6 is a front view showing a second assembly step of the first coupling of FIG. 2.
Figure 7:
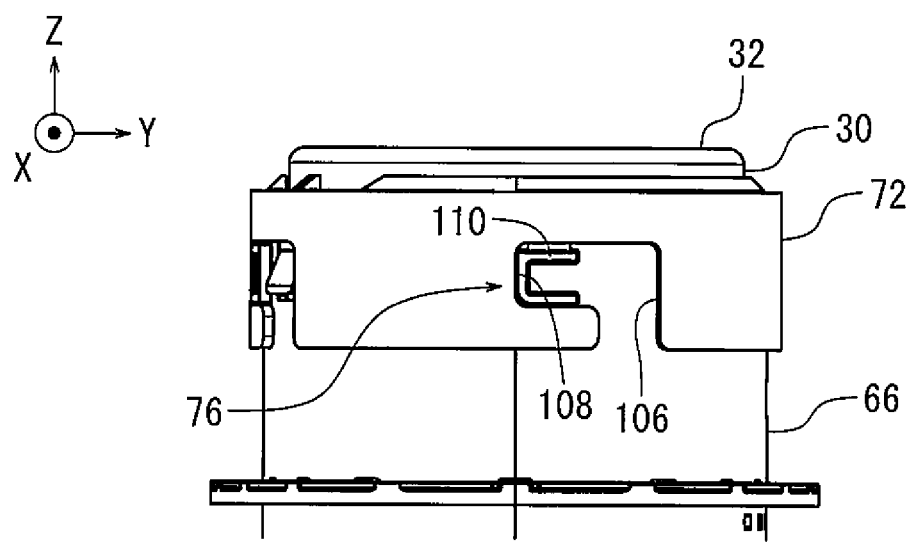
FIG. 7 is a left side view showing a second coupling of FIG. 3.

Embodiments of the first coupling 74 and the second coupling 76 will be described with reference to FIGS. 5-7. The fixed member 82 is not shown in FIGS. 5-7 for the purpose of making other parts easier to see. As illustrated in FIGS. 5 and 6, the ring member 72 has a cutout 106 and a side hole 108. The side hole 108 extends in the circumferential direction from the axial end of the cutout 106 of the ring member 72. As illustrated in FIG. 4, the ring member 72 has four sets of cutouts 106 and side holes 108 at angular intervals of about 90 degrees in the circumferential direction. As illustrated in FIG. 6, the pipe part 66 has at least one projection 110 and at least one claw part 112 positioned circumferentially adjacent to the projection 110. The claw part 112 projects outward in the radial direction of the pipe part 66, but is elastically deformable inward in the radial direction. As illustrated in FIG. 7, the pipe part 66 may further have a projection 110 without a claw part 112 adjacent thereto. In FIG. 7, two sets of the projection 110 and adjacent claw part 112 and two projections 110 that are not adjacent to a claw part 112 are arranged in an alternating manner at angular intervals of 90 degrees in the circumferential direction of the pipe part 66. For instance, the pipe part 66 may have four projections 110 angularly spaced 90 degrees apart in the circumferential direction of the pipe part 66. The pipe part 66 may also have two claw parts 112 angularly spaced 180 degrees apart, with each claw part 112 being positioned circumferentially adjacent to one projection 110. The cutout 106, the side hole 108 continuous with the cutout 106, the projection 110, and the claw part 112 located adjacent the projection 110 define the first coupling 74. The cutout 106, the side hole 108 continuous with the cutout 106, and the projection 110 having no adjacent claw part 112 define the second coupling 76. From the above, it can be seen that the pair of first couplings 74 and the pair of second couplings 76 are arranged in a circumferentially alternating manner across the ring member 72 and the pipe part 66.

Next, mounting of the above-mentioned ring member 72 on the pipe part 66 will be described. The ring member 72 is attached to the portion of the pipe part 66 exposed to the outside of the vehicle body from the upper part of the pipe part 66. At this time, the circumferential positions of both the ring member 72 and the pipe part 66 are aligned so that each projection 110 of the pipe part 66 projects into a corresponding cutout 106 of the ring member 72. Thereafter, the ring member 72 is pushed down against the pipe part 66 until the upper end of each cutout 106 is abutted on the upper end of the projection 110. At this time, as illustrated in FIG. 5, the claw parts 112 are pressed and elastically deformed radially inward of the pipe part 66 by the wall of the ring member 72. Then, the ring member 72 is rotated, for instance in the counterclockwise direction (as illustrated by an arrow Y1 in FIG. 5), with respect to the pipe part 66 until each projection 110 comes into contact with the circumferential end portion of the side hole 108. When the claw parts 112 enter the corresponding cutouts 106, and the claw parts 112 extend radially outward and elastically return from the deformed state. The first coupling 74 is assembled and formed by the mounting procedure of the ring member 72 described above (e.g., so as to enter the state of FIG. 6), and simultaneously, the second coupling 76 is assembled and formed. In this embodiment, the second couplings 76 do not include the claw parts 112. Instead, the projection 110 is abutted to the circumferential end portion of the side hole 108, for instance by the above-described mounting procedure (e.g., to enter the state in FIG. 7).

In the first coupling 74 and the second coupling 76, engagement of the projections 110 and the side holes 108 function to prevent the ring member 72 from moving axially relative to the pipe part 66, that is, in the vertical direction as shown in the Figures. Accordingly, the ring member 72 is prevented from coming off. As illustrated in FIG. 6, in the first coupling 74, engagement of the claw part 112 and the cutout 106 prevent the ring member 72 from rotating relative to the pipe 66, for instance in the clockwise direction (as illustrated by an arrow Y2 in FIG. 6). That is, the rotation is stopped.

When a filler pipe is made of a material, such as resin, which has a relatively large dimensional change due to temperature change, it is anticipated that it may expand in the axial direction (e.g., due to thermal expansion). Along with the movement of the filler pipe, an air filter device housing through which the filler pipe passes can approach the fixed member. If the filter housing contacts the fixed member, the filter housing and the air filter disposed in the filter housing may be damaged. However, in the present embodiment disclosed herein, the flange 78 is located at a distance spaced apart from the filter housing 68 in the axial direction of the pipe part 66. Therefore, even when the filler pipe 30 extends in the axial direction causing the air filter device 60 to approach the fixed member 82, the flange 78 abuts the fixed member 82 so that the air filter device 60 does not further approach the fixed member 82. Therefore, the filter housing 68 is prevented from abutting the fixed member 82. Due to this configuration, it is possible to prevent the filter housing 68 and the air filter 62 from being damaged.

The pipe part 66 has a drain hole 80 between the flange 78 and the filter housing 68, the filter housing 68 being located at a distance from the flange 78. As described above, even when the filler pipe 30 extends in the axial direction and causes the air filter device 60 to approach the fixed member 82, the flange 78 does not move beyond the state in which the flange 78 is in contact with the fixed member 82. Therefore, it is possible to prevent the drain hole 80 from being blocked by the fixed member 82. Consequently, a liquid, such as water, in the pipe part 66 can be discharged to the outside.

The ring member 72 and the pipe part 66 have a first coupling 74 and a second coupling 76. The first coupling 74 and the second coupling 76 formed by parts of both the ring member 72 and the pipe part 66. The first coupling 74 and the second coupling 76 are configured to prevent the ring member 72 from coming off the pipe 66 when the ring member 72 is mounted thereto. The first coupling 74 also stops rotation of the ring member 72 when the ring member 72 is mounted thereto. Accordingly, mounting of the ring member 72 on the tubular pipe part 66 can be maintained.

As previously mentioned, to mount the ring member 72 on the pipe part 66, first, while the projection 110 is projecting into the cutout 106, the projection 110 is abutted on the end of the cutout 106 proximal the fuel filler opening 32 side. In this state, the claw part 112 is elastically deformed by the wall surface of the ring member 72. After that, the ring member 72 is rotated in the circumferential direction relative to the pipe part 66 until the positions of the cutout 106 and the claw portion 112 in the circumferential direction match. As a result, the projection 110 projects into the side hole 108 and the claw part 112 is allowed to return from the elastically deformed state.

As described above, the ring member 72 may be attached to the pipe part 66 after the feed pipe device 50 is inserted into the fixed member 82 and fixed to the vehicle body. At such time, the fixed member 82 or other component may block the operator's view of the projection 110 and/or the claw part 112 formed on the pipe part 66, depending on the shape and layout thereof. Therefore, it may be difficult to assemble the device while visually confirming the relative positions of the ring member 72 and the pipe part 66. Accordingly, it may be difficult to assemble the first coupling 74. However, since the air filter device 60 of the present disclosure is configured as described above, assembling the first coupling 74 can be easily performed by groping work, such as by touch alone, as follows. For instance, the assembly work can consists of the following three steps. In the first step, an operator may align the cutout 106 formed in the ring member 72 and the projection 110 of the pipe part 66 in the axial direction. In the second step, the operator may push the ring member 72 down until the projection 110 abuts the end of the cutout 106 proximal the fuel filler opening 32 side. In the third step, the operator may rotate the ring member 72 with respect to the pipe part 66 until the projection 110 abuts on the circumferential end portion of the side hole 108. These steps can be realized by feel and touch alone. That is, one may rely on their sense of touch alone, without the need for visual inspection to ensure proper attachment/fit. Therefore, the operator can easily attach the ring member 72 to the pipe part 66.

Hereinafter, a second embodiment will be described. In the second embodiment, the air filter device is not directly attached to the filler pipe as described in the first embodiment, but is instead attached to an intermediate connection pipe member. The connection pipe member may be connected to an end of the filler pipe opposite to an end of the filler pipe proximal the fuel tank side. Hereinafter, the second embodiment will be described with reference to FIG. 8. It should be noted that the second embodiment is different from the first embodiment mainly in respect to the above described feature. Therefore, only the features substantially different from the first embodiment will be described, and the substantially similar features will not be illustrated or described.

Figure 8:
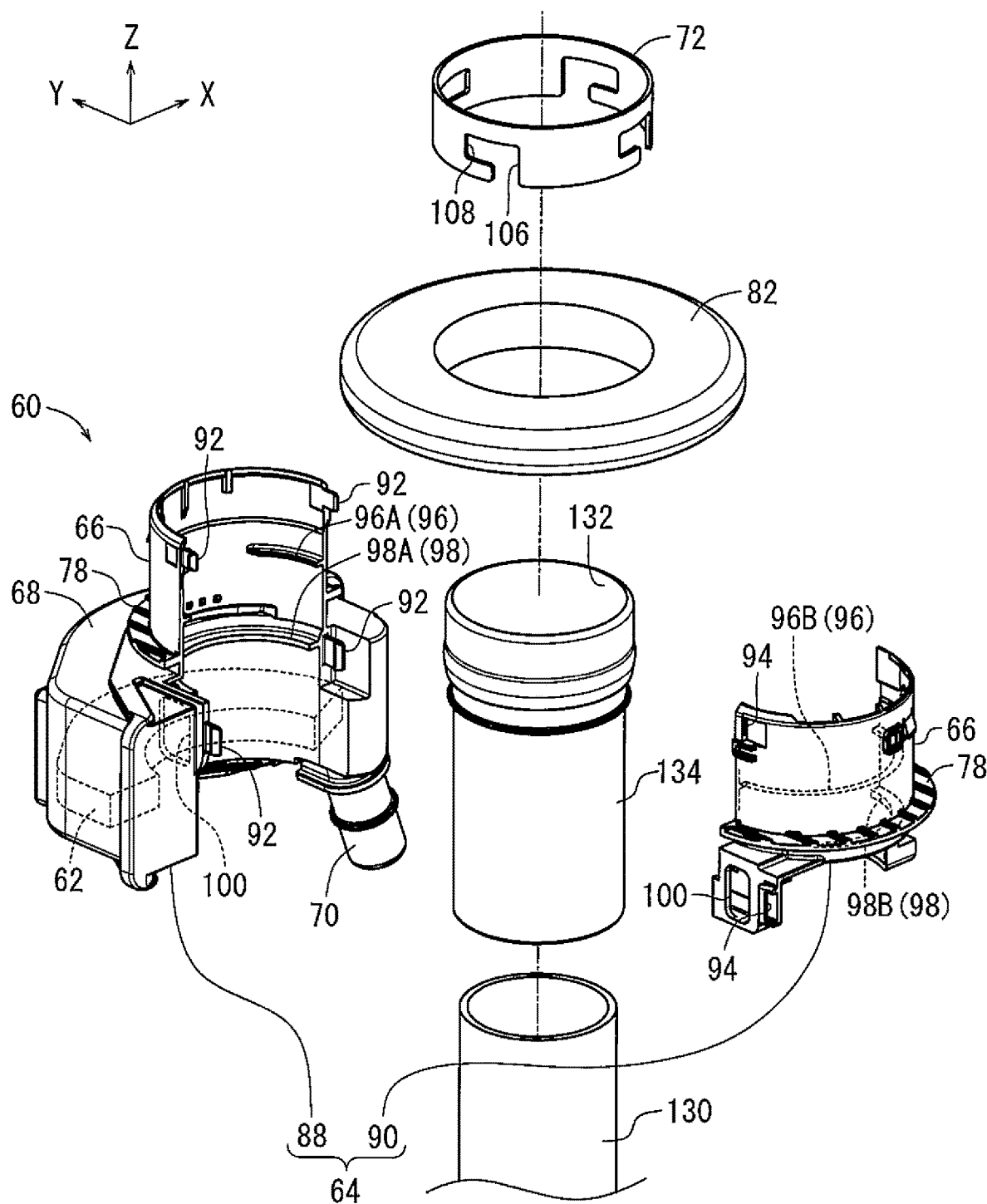
FIG. 8 is an exploded view of a second embodiment of an air filter device in accordance with the principles described herein.

In the second embodiment illustrated in FIG. 8, an air filter device 60 is attached to a connection pipe member 134 that is connected to an end of the filler pipe 130 distal the fuel tank 12 (e.g., see FIG. 1). More specifically, the connection pipe member 134 is accommodated in a pipe part 66. A portion of the connection pipe member 134 forms a fuel filler port 132. The filler pipe 130 and the connection pipe member 134 may be formed of any materials, for example, resin or metal. However, the filler pipe 130 may extend axially (e.g., due to thermal expansion) at certain temperatures when it is formed of certain materials, such as resin. The air filter device 60, with the connection pipe portion 134 received in the pipe part 66, may approach a fixed member 82 during this expansion. If the filter housing 68 were to come into contact with the fixed member 82, the filter housing 68 and the air filter 62 may possibly break. However, since the air filter 62 according to the second embodiment includes common structures as those of the first embodiment, the filter housing 68 is prevented from coming into contact with the fixed member 82. As a result, breakage to the filter housing 68 and the air filter 62 can be prevented.

Figure 9:
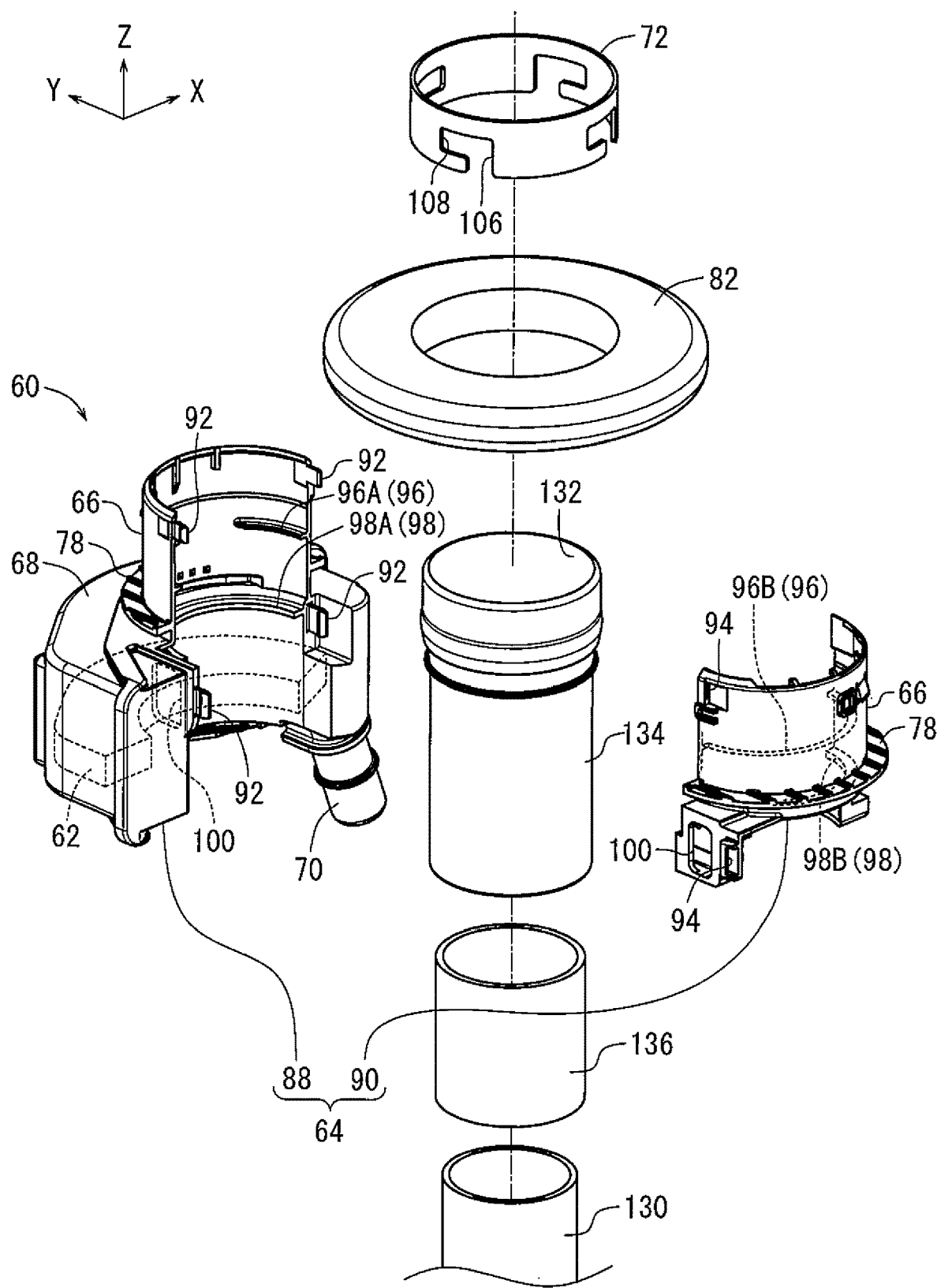
FIG. 9 is an exploded view of a third embodiment of an air filter device in accordance with the principles described herein.

The air filter device disclosed in the present specification is not limited to the above-described embodiments, and various modifications are possible. In the second embodiment, it is not necessary that only the connection pipe member 134 is received in the pipe part 66 of the air filter device 60. For example, both the connection pipe member 134 and the filler pipe 130 may be received in the pipe 66 of the air filter device 60. Also, as shown in FIG. 9, more than one connection pipe member (e.g., two connection pipe members 134, 136 are shown in FIG. 9) may be connected to an end of the filler pipe 130 distal the fuel tank 12 (e.g., see FIG. 1). In the embodiment illustrated in FIG. 9, the connection pipe member 134 is not directly connected to the filler pipe 130 but rather indirectly coupled thereto. However, similar to the first and second embodiments, when the filler pipe 130 is formed of resin, it may axially extend at certain temperatures. Accordingly, the air filter device 60 with the connection pipe member 134 received in the pipe part 66 may approach the fixed member 82.

In the first and second embodiments, the air filter device 60 is mounted on an automobile 1. However, such embodiments shall not be limited to an automobile, as long as it is a vehicle mounted with a gasoline engine. For example, it may be a motorcycle, a ship, or the like. Further, when a filler pipe or connection pipe member has sufficient strength, the ring member may be omitted. Other embodiments may allow the air filter device 60 to be mounted on other structures not explicitly mentioned herein.

What is claimed is:

1. An air filter device, comprising:
   an air filter for filtering atmospheric air; and
   a filter case including a filter housing for housing the air filter, wherein:
   the filter case has a pipe part enclosing a second end of a filler pipe, the second end of the filler pipe defining a fuel filler opening and being opposite to a first end of the filler pipe connected to a fuel tank of a vehicle;
   a distance between the pipe part and the fuel filler opening is less than a distance between the filter housing and the fuel filler opening;
   the pipe part is configured to be inserted into a fixed member that is fixed to a vehicle body;
   the pipe part has a flange extending radially outward from the pipe part; and
   the flange has a ring, plate shape and is spaced apart from the filter housing in an axial direction of the pipe part.

2. The air filter device according to claim 1, further comprising:
   a ring member configured to be fitted on a fuel filler opening side end of the pipe part such that the ring member is radially positioned between the fixed member and the pipe part, the fuel filler opening side end of the pipe part being opposite to a fuel tank side end of the pipe part such that a distance between the fuel filler opening side end and the fuel filler opening is less than a distance between the fuel tank side end and the fuel filler opening.

3. The air filter device according to claim 2, further comprising:
a coupling preventing the ring member from moving axially and rotationally relative to the pipe part when the ring member is fitted on the pipe part, wherein:
the ring member includes a first end part and a second end part such that the first end part and the second end part are axially opposite to each other and such that an axial distance between the first end part and the fuel filler opening is less than an axial distance between the second end part and the fuel filler opening when the ring member is fitted on the fuel filler opening side end of the pipe part; and
wherein the coupling comprises:
a projection protruding radially outward from the pipe part;
an elastically deformable claw formed on the pipe part so as to be adjacent to the projection;
a cutout axially extending from the second end part of the ring member; and
a lateral slit extending from a fuel filler opening side end of the cutout in a circumferential direction of the ring member.

4. The air filter device according to claim 3, wherein:
the ring member is configured to be fitted on the pipe part by inserting the pipe part into the ring member such that the projection moves along the cutout, and then rotating the ring member relative to the pipe part until the projection and the claw are arranged in the lateral slit.

5. The air filter device according to claim 1, wherein the pipe part has a drain hole positioned between the flange and the filter housing.

6. An air filter device, comprising:
an air filter for filtering atmospheric air; and
a filter case including a filter housing for housing the air filter, wherein:
the filter case has a pipe part enclosing a second end of a filler pipe, the second end of the filler pipe defining a fuel filler opening and being opposite to a first end of the filler pipe connected to a fuel tank of a vehicle;
a distance between the pipe part and the fuel filler opening is less than a distance between the filter housing and the fuel filler opening;
the pipe part is configured to be inserted into a fixed member that is fixed to a vehicle body;
the pipe part has a flange extending radially outward from the pipe part; and
the flange is spaced apart from the filter housing in an axial direction of the pipe part;
wherein the pipe part has a drain hole positioned between the flange and the filter housing.

7. An air filter device, comprising:
an air filter for filtering atmospheric air; and
a filter case including a filter housing for housing the air filter, wherein:
the filter case has a pipe part enclosing a connection pipe member, the connection pipe member being connected to a second end of a filler pipe that is opposite to a first end of the filler pipe connected to a fuel tank of a vehicle, the second end of the filler pipe defining a fuel filler opening;
a distance between the pipe part and the fuel filler opening is less than a distance between the filter housing and the fuel filler opening;
the pipe part is configured to be inserted into a fixed member that is fixed to a vehicle body;
the pipe part has a flange extending radially outward from the pipe part; and
the flange has a ring, plate shape and is axially spaced apart from the filter housing.

8. The air filter device according to claim 7, further comprising:
a ring member configured to be fitted on the pipe part at a fuel filler opening side end of the pipe part such that the ring member is radially disposed between the fixed member and the pipe part, the fuel filler opening side end being opposite to a fuel tank side end of the pipe part such that a distance between the fuel filler opening side end and the fuel filler opening is less than a distance between the fuel tank side end and the fuel filler opening.

9. The air filter device according to claim 8, further comprising:
a coupling preventing the ring member from detaching from the pipe part and from rotating relative to the pipe part when the ring member is fitted on the pipe part, wherein:
the ring member includes a first end part and a second end part such that the first end part and the second end part are axially opposite to each other and such that the first end part is disposed closer to the fuel filler opening than the second end part when the ring member is fitted on the fuel filler opening side end of the pipe part; and
wherein the coupling comprises:
a projection protruding radially outward from the pipe part;
an elastically deformable claw formed on the pipe part so as to be adjacent to the projection;
a cutout axially extending from the second end part of the ring member; and
a lateral slit extending from a fuel filler opening side end of the cutout in a circumferential direction of the ring member.

10. The air filter device according to claim 9, wherein:
the ring member is configured to be attached to the pipe part by inserting the pipe part into the ring member such that the projection moves along the cutout, and then rotating the ring member relative to the pipe part until the projection and the claw are disposed in the lateral slit.

11. The air filter device according to claim 7, wherein the pipe part has a drain hole positioned between the flange and the filter housing.

12. An air filter device, comprising:
an air filter for filtering atmospheric air; and
a filter case including a filter housing for housing the air filter, wherein:
the filter case has a pipe part enclosing a connection pipe member, the connection pipe member being connected to a second end of a filler pipe that is opposite to a first end of the filler pipe connected to a fuel tank of a vehicle, the second end of the filler pipe defining a fuel filler opening;
a distance between the pipe part and the fuel filler opening is less than a distance between the filter housing and the fuel filler opening;

the pipe part is configured to be inserted into a fixed member that is fixed to a vehicle body;

the pipe part has a flange extending radially outward from the pipe part; and the flange is axially spaced apart from the filter housing;

wherein the pipe part has a drain hole positioned between the flange and the filter housing.

\* \* \* \* \*